US007931280B2

(12) United States Patent
Kato

(10) Patent No.: US 7,931,280 B2
(45) Date of Patent: Apr. 26, 2011

(54) ELECTRIC DISCHARGE LAMP CONTROL UNIT WITH SEALING STRUCTURE

(75) Inventor: Koichi Kato, Toyoake (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 11/986,646

(22) Filed: Nov. 21, 2007

(65) Prior Publication Data

US 2008/0157701 A1 Jul. 3, 2008

(30) Foreign Application Priority Data

Nov. 23, 2006 (JP) ................................ 2006-316399

(51) Int. Cl.
*F16J 15/08* (2006.01)

(52) U.S. Cl. ......................... 277/650; 362/362; 362/365

(58) Field of Classification Search .................... 315/56; 277/650; 362/365, 362
See application file for complete search history.

(56) References Cited

U.S. PATENT DOCUMENTS 6,774,563 B2 * 8/2004 Kling ........................... 313/623
2006/0097643 A1 * 5/2006 Kato et al. ....................... 315/56
2006/0227254 A1 * 10/2006 Kato et al. .................... 348/836

FOREIGN PATENT DOCUMENTS

JP 10-051158 2/1998

* cited by examiner

*Primary Examiner* — Douglas W Owens
*Assistant Examiner* — Jae K Kim
(74) *Attorney, Agent, or Firm* — Harness, Dickey & Pierce, PLC

(57) ABSTRACT

The present invention provides an electric discharge lamp control unit which is capable of enhancing air-tightness in the electric discharge lamp while suppressing increase in the size thereof. The electric discharge lamp control unit for controlling lighting ON/OFF of an electric discharge lamp includes an electronic component in which a circuit element is implemented and which has a connector section for connection to an outside thereof; and a casing for housing the electronic component which includes a base on which the electronic component is mounted and a cover which covers the base. The thorough hole is sealed with the electronic components on the inner side of the base.

13 Claims, 4 Drawing Sheets

ELECTRIC DISCHARGE LAMP CONTROL UNIT WITH SEALING STRUCTURE

CROSS-REFERENCE TO RELATED APPLICATION

This application is related to Japanese Patent Application NO. 2006-316399 filed on Nov. 23, 2006, the contents of which are hereby incorporated by reference.

BACKGROUND OF THE INVENTION

1. Technical Field of the Invention

The present invention relates to an electric discharge lamp control unit which is capable of suppressing harmful effects caused by liquid.

2. Description of the Related Art

Conventionally, an art is disclosed in Japanese Patent Application Laid-Open Publication NO. 10-51158 as an electronic control unit which is employed in a control unit of an electric discharge lamp and which is capable of enhancing waterproof property.

The electronic control unit as disclosed in Japanese Patent Application Laid-Open Publication NO. 10-51158 has a case which includes a box and a cover and which houses a circuit board on which electronic components are implemented. A rib which protrudes from the edge section of the cover toward the inner face side of the box when the opening section of the box is covered with the cover is integrally provided, and resin is filled inside the box so that the resin is in contact with the rib. A cord comes out from the casing through an opened portion thereof for connecting the circuit board and the electric discharge lamp, and the casing is attached so that the opening section of the lamp body of the electric discharge lamp corresponds to the opened portion of the cover.

Thus, this enables preventing liquid from intruding into the electronic components and the circuit board which are housed in the case, even if a gap is generated at a joint between the cover and the box and liquid has intruded inside therethrough. This is because the rib of the cover is in contact with the resin in the box at a portion just inside of the gap.

As described above, since the electronic control unit as disclosed in Japanese Patent Application Laid-Open Publication NO. 10-51158 enables preventing liquid from intruding into the electronic components and the circuit board housed in the case, the electronic control unit is also considered to be capable of making the inside of the electric discharge lamp air tight. However, there is a need for providing a rib in the cover, thereby causing a disadvantage in that the size of the electronic control unit increases.

SUMMARY OF THE INVENTION

The present invention has been accomplished in view of the foregoing problem, and it is an object of the present invention to provide an electric discharge lamp control unit which is capable of enhancing air-tightness in the electric discharge lamp while suppressing increase in the size thereof.

To accomplish the foregoing object, an electric discharge lamp control unit according to the present invention controls lighting ON/OFF of an electric discharge lamp and includes: an electronic component in which a circuit element is implemented and which has a connector section for connection to an outside thereof; and a casing which houses the electronic component and which includes a base on which the electronic component is mounted and a cover which covers the base. Furthermore, a thorough hole is formed at a position corresponding to the connector section of the base for connecting the connector section and an electric discharge lamp-side connector section of the electric discharge lamp, and the thorough hole is sealed with the electronic component on the inner side of the base.

In such electronic discharge lamp control units, liquid can intrude into the casing, for example, through a gap between the base and the cover. However, even if liquid has intruded into the casing, sealing of the thorough hole with the electronic component enables suppressing the liquid from passing through the thorough hole and thus reaching inside of the electric discharge lamp. Accordingly, there is no need for providing a rib in the cover and/or the base to prevent liquid intrusion, thereby enabling enhancing air-tightness in the electric discharge lamp while suppressing increase in the size of the electric discharge lamp control unit.

DESCRIPTION OF THE PREFERRED EMBODIMENT

Embodiment of the present invention will now be described with reference to drawings.

Referring to FIG. 1 to FIG. 8, an embodiment of the electric discharge lamp control unit is preferably employed in control unit for an electric discharge lamps such as a headlamp of a vehicle. At first, the overall configuration of an electric discharge lamp control unit according to an embodiment of the present invention now will be described.

Figure 1:
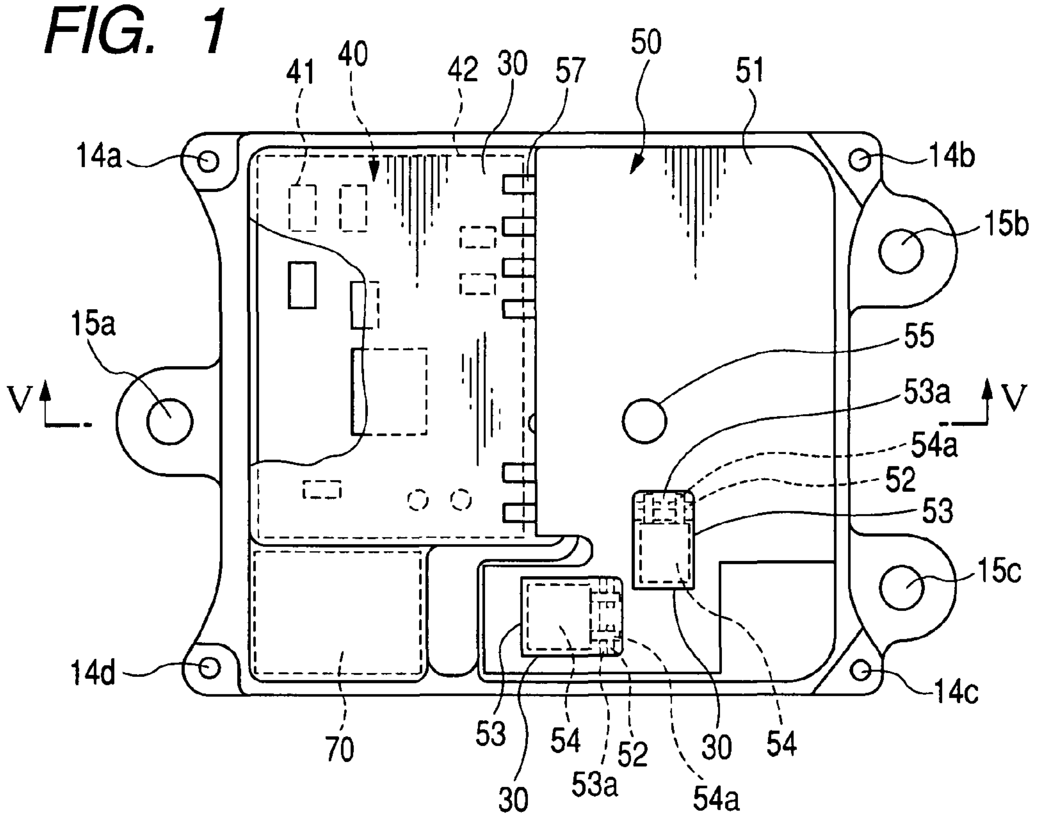
FIG. 1 is a plan view showing a schematic structure of an electric discharge lamp control unit according to the embodiment of the present invention in the state where the first and a second electronic components are mounted thereon.
Figure 7:
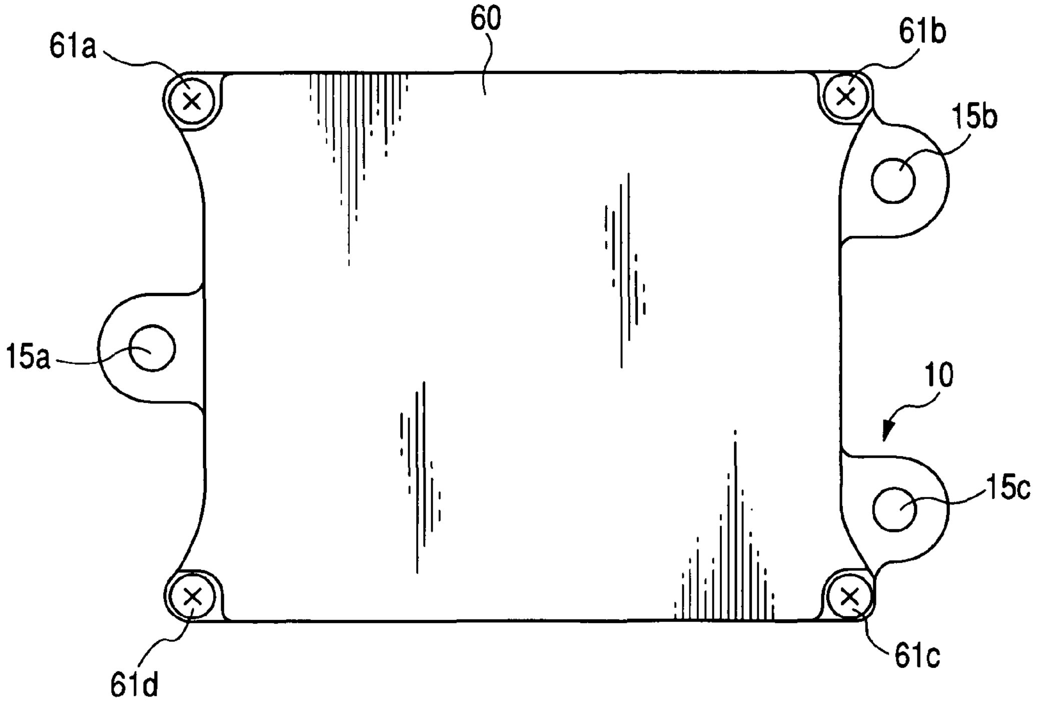
FIG. 7 is a plan view showing a schematic structure of the electric discharge lamp control unit according to the embodiment of the present invention in the state where the base and the cover are connected to each other.

As shown in FIG. 1 and FIG. 7 for example, the electric discharge lamp control unit is a so called ballast which controls lighting ON/OFF of the electric discharge lamp (hereinafter, also referred to as a ballast), and includes a casing including a base 10 and a cover 60, and electronic components, that is, a first electronic component 40 and a second electronic component 50, which are housed in the casing (the base 10 and the cover 60).

Figure 4:
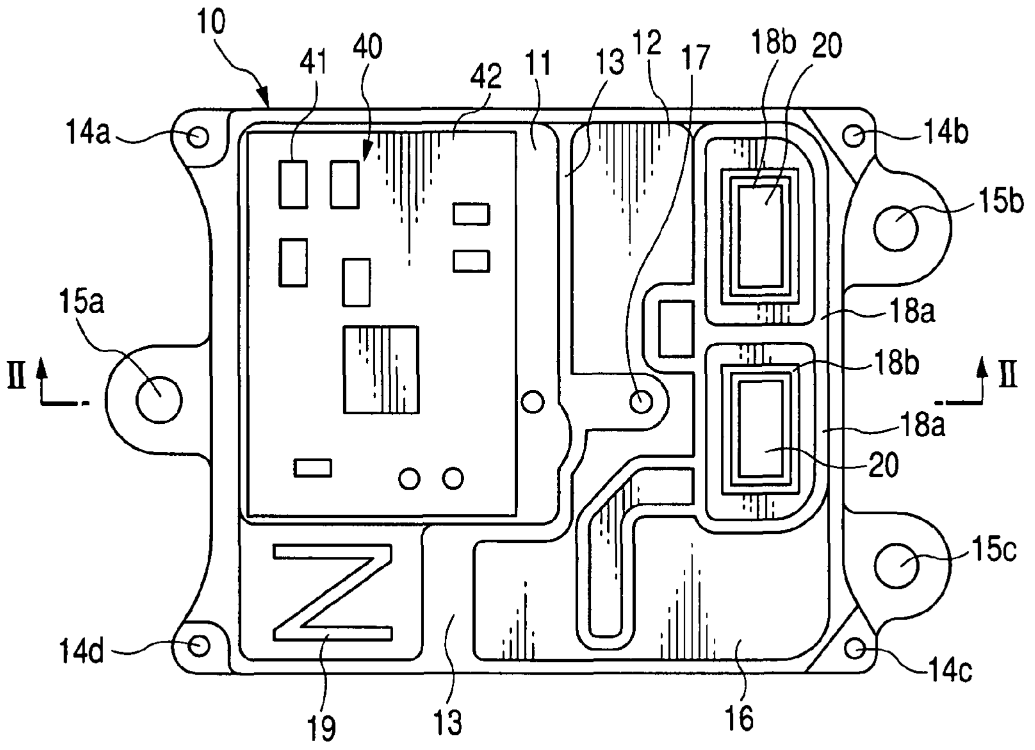
FIG. 4 is a plan view showing a schematic structure of an electric discharge lamp control unit according to an embodiment of the present invention in the state where a first electronic component is mounted thereon.

The base 10 is made of a metallic material, and is a box-shaped member which has been divided by a wall section 13 into a first chamber 11 and a second chamber 12 as shown in FIG. 4. The first electronic component 40 and the second electronic component 50 are mounted in the first chamber 11 and the second chamber 12, respectively. Accordingly, dividing of the base 10 by the wall section 13 into the first chamber 11 and the second chamber 12 as in the present embodiment enables suppressing noise of one of the electronic components (the first electronic component 40 or the second electronic component) mounted on the first chamber 11 and the second chamber 12 from being propagated to the other electronic component (that is, the second electronic component or the first electronic component).

In addition, a flange is formed around the base 10 and threaded holes for the cover 14*a* to 14*d* for connecting the cover 60 with securing members 61*a* to 61*d* such as bolts are formed at four locations (four corners) of the flange. The portion at which the base 10 and the cover 60 are in contact with each other is a flat plane on which no rib is formed. Accordingly, the base 10 and the cover 60 are secured to each other merely with the securing members 61*a* to 61*d*.

Figure 2:
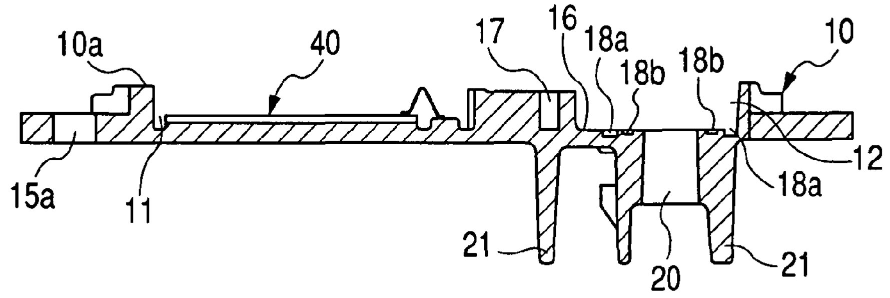
FIG. 2 is a sectional view cut along II-II in FIG. 4.

The first electronic component 40 is mounted in the first chamber 11 of the base 10 via an adhesive as shown in FIG. 4, FIG. 2. In addition, a transformer 70 which is electrically connected to the first electronic component 40 via a terminal (not shown) is implemented in the first chamber 11 (although the transformer 70 is not implemented in FIG. 4). The transformer 70 includes a protrusion section on a face which is opposed to a bottom face 16 of the base 10. In addition, as shown in FIG. 4, a concave section 19 which has a shape which corresponds to the protrusion section formed on the transformer 70 is formed in the bottom face 16 of the first chamber 11. Subsequently, the transformer 70 is mounted in the state where the protrusion section has been inserted into the concave section 19 of the first chamber 11 via an adhesive.

Figure 5:
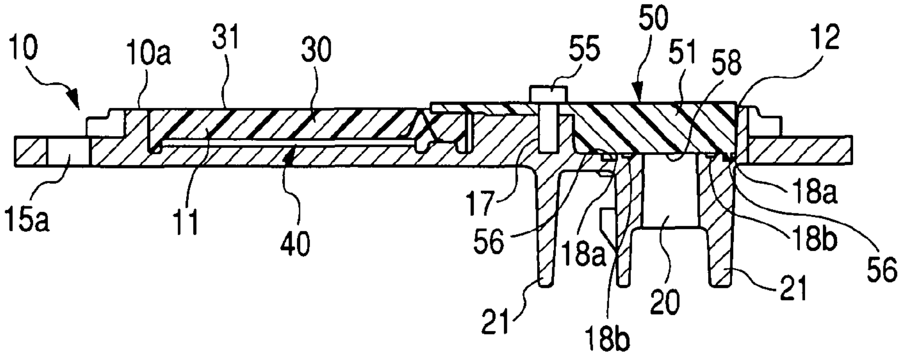
FIG. 5 is a sectional view cut along V-V in FIG. 1.

Subsequently, as shown in FIG. 1 and FIG. 5, the first chamber 11 is filled with an anti-splash agent 30 in the state where the first electronic component 40 and the transformer 70 are mounted therein. As shown in FIG. 1, the anti-splash agent 30 can be filled to the extent that the first chamber 11 is completely filled, that is, to the extent that an anti-splash agent surface 31 of the anti-splash agent 30 is substantially flush with a side wall surface 10*a* of the base 10. As a result of this, the first electronic component 40 and the transformer 70 are coated with the anti-splash agent 30. The anti-splash agent 30 is not particularly limited as long as it is made of waterproof resin such as silicone.

The first electronic component 40 which is mounted in the first chamber 11 is not particularly limited, but it is, for example, a control circuit board in which a plurality of circuit elements 41 such as transistors and resistance are implemented on a print circuit board 42 made of, for example, a ceramic substrate, a resin substrate, and actually executes lighting ON/OFF control of the electric discharge lamp. In addition, the circuit elements 41 which are implemented on the print circuit board 42 are circuit elements of a relatively smaller size compared to circuit elements 54, to be described later, which are mounted on the second electronic component 50.

Figure 3:
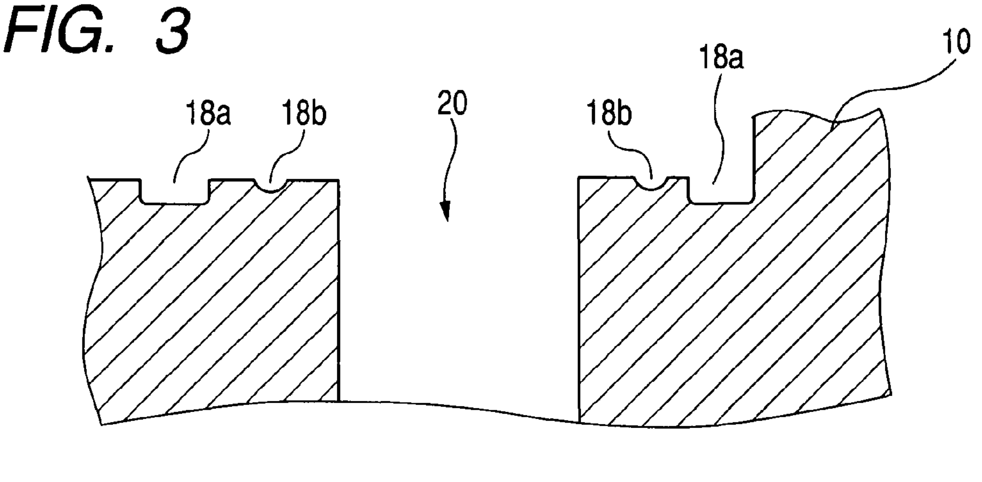
FIG. 3 is an expanded sectional view showing surroundings of the thorough hole of the electric discharge lamp control unit according to the embodiment of the present invention.

On the other hand, as shown in FIG. 1, FIG. 5, the second electronic component 50 is mounted in the second chamber 12 of the base 10 via an adhesive. Note that the bottom face 16 of the second chamber 12 includes a through hole 20, an annular concave section or groove 18*a*, and a second annular concave section or groove 18*b* as shown in FIG. 2, FIG. 3. The through hole 20 is formed at a position corresponding to a connector section 58 of the second electronic component 50, to be described later, and is an opening for electrically connecting an electric discharge lamp-side connector section (not shown) of the electric discharge lamp to the connector section 58 of the second electronic component 50. The electric discharge lamp-side connector section of the electric discharge lamp is inserted into the thorough hole 20 so that the electric discharge lamp-side connector section is electrically connected to the connector section 58 of the second electronic component 50. The annular concave section 18*a* is formed around the thorough hole 20 and has a shape which corresponds to an annular protrusion section 56 which will be described later and which is formed on the face of the second electronic component 50 which is opposed to the base 10. The second annular concave section 18*b* is formed between the thorough hole 20 and the annular concave section 18*a*. Note that the second annular concave section 18*b* does not necessarily have to be provided.

An attachment section 21 for attaching an air tight securing member 80 is provided around the thorough hole 20 on the outer side of the base 10. The air tight securing member 80 is a bellows member made of rubber or the like and is a member for attaching an electric discharge lamp housing 100 of the electric discharge lamp to the base 10 in the air-tight manner. In addition, the base 10 includes a threaded hole 17 for securing the second electronic component 50.

The second electronic component 50 which is mounted in the second chamber 12 is an input protection circuit in which the circuit elements 54 such as a coil, an electrolytic capacitor and the like are implemented in a concave section 53 of a bus bar in which terminals 52, 57 are built in a resin member 51. As shown in FIG. 1, the circuit elements 54 are implemented on the concave section 53, and the anti-splash agent 30 is filled in the concave section 53 in the state where the terminal 54*a* of the circuit elements 54 and the terminal 52 of the bus bar are electrically connected to each other. The anti-splash agent 30 is the same as the anti-splash agent 30 as described above, and it is preferable that the anti-splash agent 30 is filled to the extent that the anti-splash agent 30 covers the circuit elements 54, the terminal 54*a* and the terminal 52. Thus it is preferable since it enables providing the anti-splash agent 30 only at necessary portions.

In addition, a placement section which corresponds to shapes of the circuit elements 54 is formed in a part of the concave section 53 which is provided in the resin member 51. At the same time, a through hole 53*a* is formed in another part, more specifically, in a portion which corresponds to a connecting section for electrically connecting the terminal 54*a* of the circuit elements 54 to the terminal 52 of the bus bar. This enables making electric connection between the terminal 52 of the bus bar and the terminal 54*a* of the circuit elements 54 implemented in the concave section 53 easier. That is, this enables resistance welding between the terminal 52 of the bus bar and the terminal 54*a* of the circuit elements 54*a* implemented in the concave section 53 through the use of the thorough hole 53*a*.

The second electronic component 50 includes the connector section 58 on the face which is opposed to the base 10 for electrically connecting to the electric discharge lamp. In addition, the second electronic component 50 includes the annular protrusion section 56 which corresponds to the annular concave section 18*a* of the base 10 around the connector section 58.

The annular protrusion section 56 is also formed around the thorough hole 53*a* in the face which is opposed to the base 10. As shown in FIG. 1, doing this forms a space closed by the annular protrusion section 56 and the annular concave section

18 around the through hole 53*a* when filling the anti-splash agent 30 in the concave section 53, thereby enabling suppressing the anti-splash agent 30 from flowing into an unexpected location.

Figure 6:
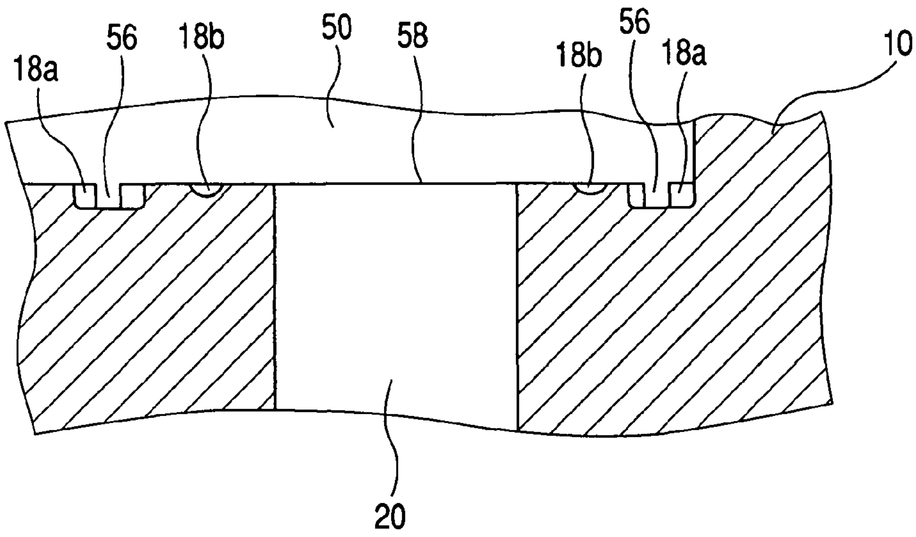
FIG. 6 is an expanded sectional view showing surroundings of the thorough hole of the electric discharge lamp control unit according to the embodiment of the present invention in the state where the second electronic component is mounted thereon.

In addition, as shown in FIG. 5, FIG. 6, the second electronic component 50 is mounted on the base 10 (in the second chamber 12) in the state where the annular protrusion section 56 has been inserted into the annular concave section 18*a* via an adhesive. Since the annular protrusion section 56 has been inserted into the annular concave section 18*a* at this time, the thorough hole 20 of the base 10 is sealed with the second electronic component 50 on one side thereof, as shown in FIG. 6.

The second electronic component 50 is secured to the base 10 by inserting a securing member 55 such as a bolt thereinto and then screwing the securing member 55 into the threaded hole 17. The first electronic component 40 and the second electronic component 50 are electrically connected to each other via a lead wire (not shown) and the terminal 57 as shown in FIG. 1.

The cover 60 is a box-shaped member made of a metallic material, and flanges are formed at the surrounding 4 locations (4 corners) as shown in FIG. 7. Each flange includes a threaded hole for the base (not shown) into which each of the securing members 61*a* to 61*d* such as bolts is inserted. In addition, the cover 60 includes an opening section 62 in which at least a part of the side wall is opened to a position 63 of the bottom face on the inner side of the cover 60, as shown in FIG. 8.

Subsequently, the cover 60 is attached to the base 10 in the state where the first electronic component 40, the second electronic component 50 and the like are mounted on the base 10, the first electronic component 40, the second electronic component 50 and the like are electrically connected to one another, and at least the circuit elements 41, 54 are coated with the anti-splash agent 30. Specifically, as shown in FIG. 7, the cover 60 is attached to the base 10 by having the securing members 61*a* to 61*d* pass through the threaded hole for the base (not shown) of the cover 60, thereby screwing them into the threaded holes for the cover 14*a* to 14*d* of the base 10.

Figure 8:
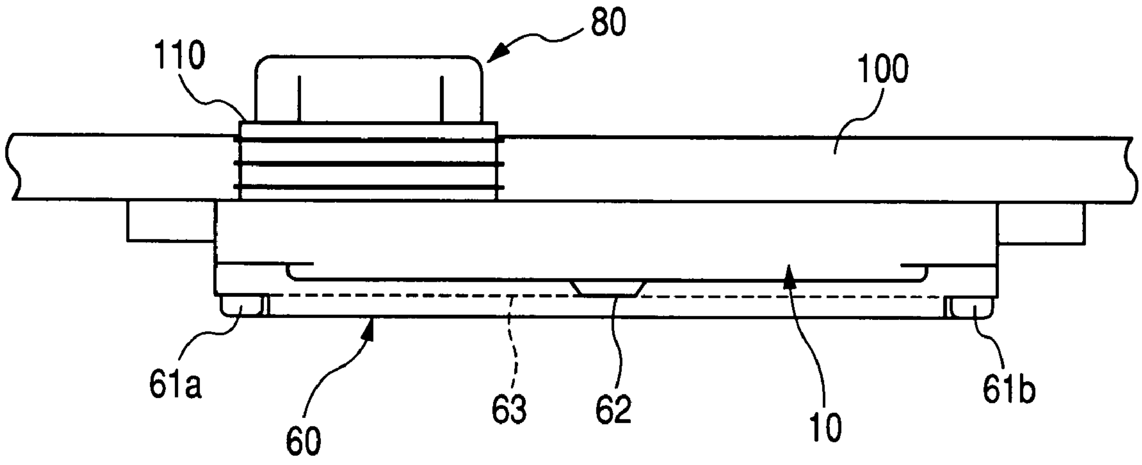
FIG. 8 is a side view showing a schematic structure of the electric discharge lamp control unit according to the embodiment of the present invention in the state where it is connected to an electric discharge lamp.

In addition, as shown in FIG. 8, the electric discharge lamp control unit is connected to the electric discharge lamp in the air-tight manner so that the cover 60 is closer to the ground than the base 10, and so that the electric discharge lamp (the electric discharge lamp housing 100: the attached body) covers the through hole 20 from the outer side of the cover 10. In other words, the electric discharge lamp control unit is attached to the electric discharge lamp (the electric discharge lamp housing 100) by having the bolts pass through threaded holes for attachment 15*a* to 15*c* in the state where the air tight securing member 80 attached on the base 10 has been inserted into the through hole 110 of the electric discharge lamp housing 100 in the air-tight manner.

In such electric discharge lamp control units, since the base 10 and the cover 60 are only secured to each other with bolts, liquid may intrude into the inside of the casing 90 through the gap between the base 10 and the cover 60 or the like. However, since the circuit elements 41, 54 are coated with the anti-splash agent, mere liquid intrusion is less likely to cause harmful effects because of exposure of the circuit elements 41, 54 to liquid. Furthermore, insertion of the annular protrusion section 56 of the second electronic component 50 into the annular concave section 18*a* of the base 10 via adhesive and sealing of the through hole 20 with the second electronic component 50 enables suppressing the liquid from passing through the through hole 20 and reaching inside of the electric discharge lamp, even if liquid has intruded into the casing. Accordingly, there is no need for providing a rib on the cover 60 and/or the base 10 to prevent intrusion of liquid, and it is possible to enhance air-tightness in the electric discharge lamp while suppressing increase in the size of the electric discharge lamp control unit.

However, if the liquid remains in the casing, in particular, on the anti-splash agent 30, liquid intrusion may cause harmful effects on the circuit elements 41, 54 (the first electronic component 40 and the second electronic component 50). Accordingly, in the present embodiment, providing on the cover 60 the opening section 62 in which at least a part of the side wall is opened to the position 63 of the bottom face on the inner side of the cover 60 enables making it easier to discharge the liquid to the outside of the casing, even if liquid has intruded into the casing.

Furthermore, in the present embodiment, the annular protrusion section 56 of the second electronic component 50 has been inserted into the annular concave section 18*a* of the base via adhesive, which further enhances adhesion between the annular concave section 18*a* and the annular protrusion section 56 compared to the case where the annular protrusion section 56 of the second electronic component 50 has been merely inserted into the annular concave section 18*a* of the base 10, enabling further enhancing air-tightness in the electric discharge lamp. However, the purpose of the present invention can be achieved merely by inserting the annular protrusion section 56 of the second electronic component 50 into the annular concave section 18*a* of the base 10.

Furthermore, as indicated in the present embodiment, the base 10 includes the second annular concave section 18*b* between the annular concave section 18*a* and the thorough hole 20. Therefore, even if adhesive has overflowed when the annular protrusion section 56 is inserted into the annular concave section 18*a*, it is possible to have the overflowed adhesive to remain in the second annular concave section 18*b*, and suppress the adhesive from reaching the terminal section 58 and deteriorating electric connectivity. However, the purpose of the present invention can be achieved even if the second annular concave section 18*b* is not provided.

Furthermore, in the present embodiment of the present invention, description has been given using an example in which the first electronic component 40 and the second electronic component 50 are electrically connected to each other as an electronic component. However, the present invention is not limited to this. For example, the purpose of the present invention can be achieved when there is a single electronic component. Alternatively, the purpose of the present invention can also be achieved when there are three or more electronic components.

Furthermore, in the present embodiment of the present invention, description has been given on the base using an example in which the base 10 of the present invention has been divided by the wall section 13 into the first chamber 11 and the second chamber 12. However, the present invention is not limited to this.

Other Embodiments

In the present invention, the electric discharge lamp can be connected in the air-tight manner so that the electric discharge lamp covers the through hole from the outer side of the base. In addition, the through hole can be sealed with the electronic components by forming the annular protrusion section around the connector section on the side closer to the base of the electronic component, forming the annular concave section corresponding to the annular protrusion section around the through hole on the inner side of the base, and inserting the annular protrusion section into the annular the concave section between the base and the electronic component.

In the configuration as described above, the annular protrusion section is formed on the side closer to the electronic component, and the annular concave section is formed on the side closer to the base, respectively. However, as opposed to this, the annular concave section may be formed on the side closer to the electronic component, and the annular protrusion section may be formed on the side closer to the base, respectively. The latter case can provide the similarly advantageous effects as the former case.

Furthermore, the annular concave section and the annular protrusion section can be connected with each other via adhesives.

Thus, this enables further enhancing adhesion between the annular concave section and the annular protrusion section and enables further enhancing air-tightness in the electric discharge lamp.

Furthermore, the base may include a second annular concave section between the annular concave section and the through hole.

Even if the adhesive has overflowed when the annular protrusion section has been inserted into the annular concave section, this enables the overflowed adhesive to remain in the second annular concave section and enables suppressing the adhesive from reaching the terminal section and thus deteriorating electric connectivity.

Furthermore, the electronic component can be employed to one which has been divided into a first electronic component in which a circuit element is implemented on a print circuit board and a second electronic component which is electrically connected to the first electronic component and in which a circuit element is implemented in a concave section of a bus bar having an annular protrusion section.

Furthermore, the circuit element can be coated with an anti-splash agent.

Even if liquid has intruded into the casing, thus this enables suppressing the circuit element from being exposed to liquid.

Furthermore, the casing can be attached to the attached body so that the cover is closer to the ground than the base, and the cover can be box shaped, and may include an opening section in which at least a part of the side wall is opened to a position of the bottom face.

Even if liquid has intruded into the casing, this enables making it easier to discharge the liquid to the outside of the casing.

Furthermore, the base can be divided by the wall section into the first chamber and the second chamber. The first chamber equipped with at least the first electronic component, and the second chamber can be equipped with the second electronic component.

Thus this enables suppressing, for example, noise of one of the electronic components (the first electronic component or the second electronic component) from being propagated to the other electronic component (the second electronic component or the first electronic component).

Furthermore, the present invention can be employed to an electric discharge lamp system which has the electric discharge lamp control unit as described above, and an electric discharge lamp of which lighting ON/OFF is controlled by the electric discharge lamp control unit.

What is claimed is:

1. A control unit for controlling an electric discharge lamp, the control unit comprising:

an electronic component in which a circuit element is implemented, the electronic component having a connector section for connection to an outside of the electronic component, the electronic component defining an annular protrusion formed around the connector section; and a casing that houses the electronic component and includes a base having a through hole and first and second annular concave grooves on which the electronic component is mounted and a cover that covers the base, wherein the through hole is formed at a position corresponding to the connector section of the electronic component to connect the connector section and an electric discharge lamp-side connector section of the electric discharge lamp, the first and second annular concave grooves are arranged surrounding the through hole on an inner side of the base at which the electronic component is mounted, the second annular concave groove is formed between the first annular concave groove and the through hole, the annular protrusion of the connector section of the electronic component is disposed within the first annular concave groove to seal the through hole with the electronic component on the inner side of the base, the first annular concave groove includes a U-shaped groove, the U-shaped groove having a closed path, the annular protrusion includes a U-shaped ridge extending from a surface of the connector section of the electronic component, a shape of the annular protrusion corresponds to a shape of the first annular concave groove, the first annular concave groove and the annular protrusion are connected to each other via adhesive, and the electric discharge lamp is connected to the control unit air tightly so that the electric discharge lamp covers the through hole from the outer side of the base, the control unit switching the electric discharge lamp ON/OFF.

2. The control unit according to claim 1, wherein the circuit element is coated with an anti-splash agent.

3. The control unit according to claim 1, wherein the casing is attached to an attached body so that the cover is closer to the ground than the base, and the cover is made of a box-shaped member which has a side wall and a bottom face, and includes an opening section in which at least a part of the side wall is opened to a position of the bottom face.

4. The control unit according to claim 1, wherein the electronic component includes a first electronic component in which the circuit element is implemented on a print circuit board, and a second electronic component which is electrically connected to the first electronic component and in which the circuit element is implemented in a concave section of a bus bar, the concave section including a through hole around which the U-shaped ridge is formed.

5. The control unit according to claim 4, wherein the base is divided by a wall section into a first chamber and a second chamber, the first chamber is equipped with the first electronic component, and the second chamber is equipped with the second electronic component.

6. An electric discharge lamp system comprising:

the control unit according to claim 1, and an electric discharge lamp of which lighting ON/OFF is controlled by the control unit.

7. The control unit according to claim 1, wherein the annular protrusion is defined by only the electronic component.

8. The control unit according to claim 7, wherein the first and second annular concave grooves are defined by only the base of the casing.

9. The control unit according to claim 8, wherein a shape of the annular protrusion corresponds to a shape of the first annular concave groove.

10. The control unit according to claim 1, wherein the first and second annular concave grooves are formed on the same plane of the base.

11. A control unit for controlling an electric discharge lamp, the control unit comprising:

an electronic component in which a circuit element is implemented, the electronic component having a connector section for connecting to an outside of the electronic component, the electronic component defining an annular protrusion extending from a surface of the electronic component, the annular protrusion fully encircling the connector section;

a casing that houses the electronic component, the casing including a base having a through hole and first and second annular concave grooves, the electronic component being mounted on a planar surface of the base to fully cover the first and second annular grooves and the through hole; wherein the through hole is formed at a position corresponding to the connector section of the electronic component to connect the connector section and an electric discharge lamp;

the first and second annular grooves each encircle an area larger than an opening of the through hole on the planar surface of the base and fully encircle the opening of the through hole on the surface of the base;

the second annular groove is formed between the first annular groove and the through hole;

the annular protrusion of the connector section of the electronic component is disposed within the first annular groove to seal the through hole;

the first annular concave groove includes a U-shaped groove, the U-shaped groove having a closed path, the annular protrusion includes a U-shaped ridge extending from a surface of the connector section of the electronic component, a shape of the annular protrusion corresponds to a shape of the first annular concave groove;

the first and second annular grooves extend into the planar surface of the base;

the first annular groove and the annular protrusion are connected to each other via adhesive; and the electric discharge lamp covers the through hole.

12. The control unit according to claim 11, wherein a portion of the first annular U-shaped groove is parallel with a portion of the second annular groove.

13. The control unit according to claim 11, wherein the first annular groove is a U-shaped groove and the annular protrusion is a U-shaped ridge.

* * * * *